United States Patent
Lee et al.

(10) Patent No.: US 10,593,954 B2
(45) Date of Patent: Mar. 17, 2020

(54) POSITIVE ELECTRODE HAVING SPECIFIED ELONGATION FOR IMPROVING SAFETY AND SECONDARY BATTERY INCLUDING THE SAME

(71) Applicant: LG Chem, Ltd., Seoul (KR)

(72) Inventors: Su-Rim Lee, Daejeon (KR); Joon Kwon, Daejeon (KR); Jae-Hyun Lee, Daejeon (KR)

(73) Assignee: LG Chem, Ltd. (KR)

( * ) Notice: Subject to any disclaimer, the term of this patent is extended or adjusted under 35 U.S.C. 154(b) by 46 days.

(21) Appl. No.: 15/744,456

(22) PCT Filed: Sep. 21, 2016

(86) PCT No.: PCT/KR2016/010543
§ 371 (c)(1),
(2) Date: Jan. 12, 2018

(87) PCT Pub. No.: WO2017/052200
PCT Pub. Date: Mar. 30, 2017

(65) Prior Publication Data
US 2018/0212249 A1 Jul. 26, 2018

(30) Foreign Application Priority Data
Sep. 21, 2015 (KR) ......................... 10-2015-0133020

(51) Int. Cl.
| | | |
|---|---|---|
| *H01M 4/70* | (2006.01) | |
| *H01M 4/66* | (2006.01) | |
| *H01M 10/42* | (2006.01) | |
| *H01M 4/13* | (2010.01) | |
| *H01M 4/02* | (2006.01) | |
| *H01M 4/131* | (2010.01) | |
| *H01M 10/0525* | (2010.01) | |
| *H01M 4/04* | (2006.01) | |
| *H01M 4/505* | (2010.01) | |
| *H01M 4/525* | (2010.01) | |

(52) U.S. Cl.
CPC ............... *H01M 4/70* (2013.01); *H01M 4/13* (2013.01); *H01M 4/66* (2013.01); *H01M 4/661* (2013.01); *H01M 10/4235* (2013.01); *H01M 4/0404* (2013.01); *H01M 4/0435* (2013.01); *H01M 4/131* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ............ H01M 4/70; H01M 4/13; H01M 4/66; H01M 4/661; H01M 10/4235
USPC ........................................................ 429/245
See application file for complete search history.

(56) References Cited

U.S. PATENT DOCUMENTS

| | | | |
|---|---|---|---|
| 6,190,803 B1* | 2/2001 | Tomiyama ............ | H01M 4/485 429/231.1 |
| 2005/0186477 A1 | 8/2005 | Ryu | |
| 2010/0068627 A1 | 3/2010 | Muraoka et al. | |
| 2011/0008679 A1* | 1/2011 | Mukasa ............... | H01M 2/1653 429/246 |
| 2011/0027635 A1* | 2/2011 | Muraoka ................. | H01M 4/13 429/94 |
| 2011/0111302 A1* | 5/2011 | Sato ..................... | H01M 4/0404 429/231.1 |
| 2011/0135997 A1* | 6/2011 | Watanabe ............ | H01M 2/0212 429/162 |
| 2011/0136010 A1* | 6/2011 | Muraoka ................. | H01M 4/13 429/217 |
| 2011/0151296 A1 | 6/2011 | Muraoka et al. | |
| 2011/0165445 A1* | 7/2011 | Muraoka ............. | H01M 2/1061 429/94 |
| 2011/0244323 A1* | 10/2011 | Ueda ................... | H01M 4/0404 429/211 |
| 2011/0244325 A1 | 10/2011 | Muraoka et al. | |
| 2012/0219817 A1* | 8/2012 | Konishi ................. | C22C 21/00 428/596 |
| 2013/0177792 A1* | 7/2013 | Takahata ............... | H01M 4/133 429/94 |

FOREIGN PATENT DOCUMENTS

| | | |
|---|---|---|
| JP | 2000149928 A | 5/2000 |
| JP | 2008186704 A | 8/2008 |
| JP | 2009048876 A | 3/2009 |
| JP | 2013131330 A | 7/2013 |
| KR | 20050086218 A | 8/2005 |
| KR | 20090086457 A | 8/2009 |
| KR | 101062690 B1 | 9/2011 |
| KR | 101236069 B1 | 2/2013 |

OTHER PUBLICATIONS

Search report from International Application No. PCT/KR2016/010543, dated Dec. 28, 2016.
Extended European Search Report for Application No. EP16848925.0 dated Jun. 21, 2018.
Masafumi Arakawa, "Introduction to Particle Size Measurement", Journal of the Society of Powder Engineering, Japan, Jun. 10, 1980 vol. 17, No. 6, pp. 299-307 (included herein is a partial machine English translation).

* cited by examiner

Primary Examiner — Sean P Cullen
(74) Attorney, Agent, or Firm — Lerner, David, Littenberg, Krumholz & Mentlik, LLP

(57) ABSTRACT

The present disclosure relates to an electrode having improved safety and a secondary battery including the same. It is possible to prevent or significantly reduce an internal short-circuit between a positive electrode current collector and a negative electrode current collector and an internal short-circuit between a positive electrode current collector and a negative electrode active material layer, caused by nail penetration, by controlling the elongation of a positive electrode to 0.6-1.5%.

6 Claims, No Drawings

POSITIVE ELECTRODE HAVING SPECIFIED ELONGATION FOR IMPROVING SAFETY AND SECONDARY BATTERY INCLUDING THE SAME

CROSS-REFERENCED TO RELATED APPLICATIONS

This application is a national phase entry under 35 U.S.C. § 371 of International Application No. PCT/KR2016/010543, filed on Sep. 21, 2016 which claims priority to Korean Patent Application No. 10-2015-0133020 filed on Sep. 21, 2015, the disclosures of which are incorporated herein by reference.

TECHNICAL FIELD

The present disclosure relates to an electrode having improved safety and a secondary battery including the same. More particularly, the present disclosure relates to a positive electrode having increased penetration resistance against a nail and thus ensuring the safety of a secondary battery against an internal short-circuit.

BACKGROUND ART

The energy of a battery increases in proportion to energy density. In addition, as conversion of a secondary battery into one having higher energy proceeds, the safety of a battery is threatened. In a normal state, electric energy stored in a positive electrode and electric energy in a negative electrode are maintained separately and safely by a separator. However, a short-circuit between the positive electrode and the negative electrode may be caused by various factors to emit the stored electric energy in a short time, thereby causing a heat emission/ignition or thermal runaway phenomenon. Particularly, in the case of a lithium secondary battery, when a high degree of current flows in the battery within a short time due to an internal short-circuit caused by nail penetration, the battery is heated by heat emission and there is the risk of ignition/explosion.

Therefore, as a part of attempts for ensuring the safety against nail penetration, a method for using a device mounted to the outside of a cell and a method for using a material inside of a cell have been studied and used mainly. A positive temperature coefficient (PTC) device using a change in temperature, a protective circuit using a change in voltage and a safety vent using a change in internal pressure of a battery correspond to the former, while addition of a material capable of being changed physically, chemically or electrochemically depending on a change in temperature or voltage in a battery corresponds to the latter.

Since the devices mounted to the outside of a cell use temperature, voltage and internal pressure, they can bring about confident interruption (breakage) but require an additional installation process and installation space. In addition, it is known that such devices cannot perform a protective function sufficiently, when a rapid response time is required, for example, in the case of an internal short-circuit, nail penetration, local damage, or the like.

As a method of using a material in a cell, studies about addition of a chemical safety device including addition of an additive capable of improving safety to an electrolyte or electrode have been conducted. Such a method is advantageous in that it does not require a space and can be applied to any types of batteries. However, it is reported that a material forming a passive film on an electrode is produced or volumetric swelling occurs when the temperature is increased, thereby increasing the resistance of an electrode. In each case, there are problems in that byproducts are generated upon the formation of a passive film and the performance of a battery is degraded, or the volume occupied by the material in a battery is large to cause a decrease in the capacity of a battery.

Therefore, there is still a need for developing a technology for preventing heat emission or ignition caused by nail penetration.

DISCLOSURE

Technical Problem

The present disclosure is designed to solve the problems of the related art, and therefore the present disclosure is directed to providing an electrode capable of solving the problem of heat emission/ignition caused by a short-circuit by controlling the mechanical properties of a positive electrode and thus controlling the resistance against an internal short-circuit caused by nail penetration, and a secondary battery including the electrode.

Technical Solution

In one aspect of the present disclosure, there is provided a positive electrode for a secondary battery which includes a positive electrode current collector and a positive electrode active material layer provided on at least one surface of the positive electrode current collector and has an elongation of 0.6-1.5%.

The positive electrode current collector may have a thickness of 6-20 μm.

The positive electrode current collector may be aluminum foil.

The positive electrode active material may have an average particle diameter of 4-12 μm.

The positive electrode active material layer may have a porosity of 23-35% after rolling.

In another aspect of the present disclosure, there is also provided a secondary battery including the above-mentioned positive electrode, a negative electrode and a separator interposed between the positive electrode and the negative electrode.

Advantageous Effects

According to an embodiment of the present disclosure, the elongation of a positive electrode is controlled to an optimized range, thereby preventing or significantly reducing an internal short-circuit between a positive electrode current collector and a negative electrode current collector and an internal short-circuit between a positive electrode current collector and a negative electrode active material layer, caused by an indirect short-circuit through a nail caused by nail penetration and a direct short-circuit not through a nail.

Therefore, it is possible to prevent heat emission and ignition of a secondary battery caused by an internal short-circuit, thereby improving the safety of a secondary battery.

BEST MODE

Hereinafter, the present disclosure will be described in detail.

In one aspect, there is provided a positive electrode for a secondary battery which includes a positive electrode current collector and a positive electrode active material layer provided on at least one surface of the positive electrode current collector and has an elongation of 0.6-1.5%.

As used herein, 'elongation' is defined according to the following Mathematical Formula 1:

Elongation (%)=[{Length after elongation ($L'$)−Length before elongation ($L$)}/$L$]×100   [Mathematical Formula 1]

The elongation has a concept that covers both elongation in the machine direction and elongation in the transverse direction. The elongation in the machine direction may be different from the elongation in the transverse direction. In this case, the elongation is defined as an arithmetic mean of the elongation in the machine direction and elongation in the transverse direction. For example, when a positive electrode has an elongation in the machine direction of 50% and an elongation in the transverse direction of 100%, the positive electrode has an elongation of 75%.

To determine the elongation, the method defined in ISO527 is used.

To ensure safety against nail penetration, it is preferred that the elongation of a positive electrode and that of a negative electrode are small and the elongation of a separator is large. However, since copper (Cu) foil used generally as a negative electrode current collector has a significantly larger elongation, it is very difficult for Cu foil to have a desired level of elongation even when it is processed. In the case of a separator, when it has a lower elongation as compared to an electrode current collector, there is a problem of an increased possibility of contact between a positive electrode and a negative electrode during nail penetration.

According to an embodiment of the present disclosure, when a positive electrode has an elongation of 0.6-1.5%, a possibility of generation of an internal short-circuit caused by the penetration resistance of the positive electrode against a nail during nail penetration is decreased. The effect of preventing/reducing a possibility of generation of an internal short-circuit provided by the positive electrode having the above-defined elongation range can be obtained, even when a negative electrode current collector has a high elongation, such as an elongation of about 15%, and/or when a separator has a low elongation, such as an elongation of about 6%. When the positive electrode has an elongation lower than 0.6%, it may be broken during a rolling process. When the positive electrode has an elongation higher than 1.5%, it may also be elongated along the penetration direction during nail penetration and may be in contact with a negative electrode current collector or negative electrode active material, thereby causing an internal short-circuit. Otherwise, the positive electrode may be in direct contact with a nail and may be in contact with a negative electrode current collector or negative electrode active material through the nail, thereby causing an internal short-circuit.

Since the positive electrode is finished after coating, drying and rolling a slurry for forming a positive electrode active material layer on at least one surface of a positive electrode current collector, the elongation of the positive electrode is determined by the combination of a positive electrode current collector with a positive electrode active material layer.

The elongation of a positive electrode current collector may vary with the material, thickness and strength of the positive electrode current collector, and with the method for manufacturing and processing the positive electrode current collector as well.

Materials for the positive electrode current collector are not particularly limited, as long as they have high conductivity while not causing any chemical change in the corresponding battery. For example, stainless steel, aluminum, nickel, titanium, baked carbon, or aluminum or stainless steel surface-treated with carbon, nickel, titanium or silver may be used. It is preferred to use aluminum. In addition, fine surface irregularities may be formed on a current collector to increase the adhesive of a positive electrode active material. In addition, the current collectors may be used in various forms, such as a film, sheet, foil, net, porous body, foam or non-woven web.

The positive electrode current collector may have a thickness of 6-20 μm. When the positive electrode current collector has a thickness smaller than the lower limit, the cell comprising the positive electrode current collector may have decreased resistance and the positive electrode current collector may be broken during a rolling process, while providing an elongation lower than a desired lower limit of elongation. When the positive electrode current collector has a thickness larger than the upper limit, it is not possible to ensure a desired elongation and the electrode volume is increased undesirably.

The positive electrode active material layer may be provided on one surface or both surfaces of the positive electrode current collector, and may include a positive electrode active material, a conductive material and a binder.

As the particle diameter of active material particles forming a positive electrode active material layer decreases, the positive electrode active material layer tends to have a lower elongation. This is because a stress concentration phenomenon occurs so that particles having a smaller particle diameter may leave defects on a current collector during a rolling process and force (stress) concentrates on the defects during elongation, thereby causing a failure (breakage) of the positive electrode and a decrease in elongation. Active material particles may have an average particle diameter of 4-12 μm and may be used as a mixture. When active material particles are used as a mixture, the average particle diameter of the mixture is defined as arithmetic mean. When active material particles have an average particle diameter larger than the upper limit, the elongation of the active material layer departs from the above-mentioned upper limit. When active material particles have an average particle diameter smaller than the lower limit, it is difficult to carry out homogeneous dispersion during the preparation of a slurry. In this case, it is also difficult to perform rolling and thus to obtain a desired rolling thickness during a rolling process.

In addition, referring to the porosity of a positive electrode active material layer, the elongation of a positive electrode active material layer tends to be decreased as the porosity thereof is reduced. According to an embodiment of the present disclosure, it is preferred that the positive electrode active material layer has a porosity of 23-35% or 23-31%. When the porosity is smaller than the lower limit, it is not possible to ensure smooth transfer of an electrolyte and/or lithium ions, resulting in degradation of the performance of a battery. When the porosity is larger than the upper limit, it is difficult to ensure a desired elongation, resulting an undesired increase in the volume of an electrode.

As used herein, 'porosity' means the ratio of volume of pore portions (vacant spaces) present in an active material layer based on the total volume of the active material layer, and is measured by a currently used mercurimetric method.

Particular examples of the positive electrode active material that may be used include but are not limited to: a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-x}O_4$ (wherein x is 0-0.33), $LiMnO_3$, $LiMn_2O_3$ or $LiMnO_2$; a ternary lithium composite oxide represented by the chemical formula of $Li_xNi_aMn_bCo_cO_2$ (wherein $0<a\le0.9$, $0<b\le0.9$, $0<c\le0.5$, $0.85\le a+b+c\le1.05$, $0.95\le x\le1.15$); a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-x}M_xO_2$ (wherein M is Co, Mn, Al, Cu, Fe, Mg, B or Ga, and x is 0.01-0.3); a lithium manganese composite oxide represented by the chemical formula of $LiMn_{2-x}M_xO_2$ (wherein M=Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$ or the like.

The binder is an ingredient which assists the binding between an active material and a conductive material and binding to a current collector, and may be added generally in an amount of 1-50 wt % based on the total weight of the positive electrode active material layer. Particular examples of the binder may include a high-molecular weight polyacrylonitrile-co-acrylic acid but are not limited thereto. Other examples include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluororubber, various copolymers, or the like.

The conductive material is one having conductivity while not causing any chemical change in the battery, and may be added in an amount of 1-50 wt % based on the total weight of the positive electrode active material layer. Particular examples of the conductive material include graphite, such as natural graphite or artificial graphite; carbon black, such as carbon black, acetylene black, ketjen black, channel black, furnace black, lamp black or thermal black; carbon nanotube (CNT); conductive fibers, such as carbon fibers or metallic fibers; metal powder, such as fluorocarbon, aluminum or nickel powder; conductive whisker, such as zinc oxide or potassium titanate; a conductive metal oxide such as titanium dioxide; a conductive polymer such as a polyphenylene derivative; or the like.

In another aspect, there is provided a secondary battery including the positive electrode in combination with a negative electrode and a separator interposed between the positive electrode and the negative electrode.

The negative electrode may be obtained by applying a mixture containing a negative electrode active material, a binder and a conductive material onto a negative electrode current collector and then drying the solvent.

Particular examples of the negative electrode active material include: carbon and graphite materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds containing the above elements; metals and metallic compounds, and composite compounds of carbon and graphite materials; lithium-containing nitrides; or the like.

A conductive material may be further incorporated as an ingredient for improving the conductivity of the negative electrode active material. The conductive material is the same as described above.

A negative electrode current collector generally has a thickness of about 3-30 μm. There is no particular limitation in the negative electrode current collector, as long as it has conductivity while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, or the like, aluminum-cadmium alloy, or the like. In addition, similarly to the positive electrode current collector, fine surface irregularities may be formed on the surface to enhance the binding force with the negative electrode active material. The negative electrode current collector may be used in various shapes, including a film, sheet, foil, net, porous body, foam or a non-woven web.

The separator is interposed between the positive electrode and the negative electrode, and an insulating thin film having high ion permeability and mechanical strength is used as separator. The separator may have a pore diameter generally of 0.01-10 μm and a thickness of 5-50 μm. Particular examples of the separator include: olefin polymers, such as chemically resistant and hydrophobic polypropylene; sheets or non-woven webs made of glass fibers or polyethylene; or the like. When a solid electrolyte, such as a polymer, is used as an electrolyte, the solid electrolyte may also function as a separator.

A lithium secondary battery generally further includes a lithium salt-containing non-aqueous electrolyte besides the positive electrode, negative electrode and the separator.

The lithium salt-containing non-aqueous electrolyte includes a non-aqueous electrolyte and lithium. As non-aqueous electrolyte, a non-aqueous electrolyte solution, organic solid electrolyte, inorganic solid electrolyte, etc. may be used.

Particular examples of the non-aqueous electrolyte solution include aprotic organic solvents, such as N-methyl-2-pyrrolidone, propylene carbonate, ethylene carbonate, butylene carbonate, dimethyl carbonate, diethyl carbonate, gamma-butyrolactone, 1,2-dimetnoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, triphosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Particular examples of the organic solid electrolyte include polyethylene derivatives, polyethylene oxide derivatives, polypropylene oxide derivative, phosphate polymers, poly-agitation lysine, polyester sulfide, polyvinyl alcohol, polyvinylidene fluoride, polymers containing an ionic dissociatable group, or the like.

Particular examples of the inorganic solid electrolyte include nitrides, halides and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt is a material easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carboxylate, lithium tetraphenylborate, imide, or the like.

In addition, in order to improve charging/discharging characteristics, flame resistance, or the like, it is possible to add pyridine, triethyl phosphite, triethanol amine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, or the like, to the non-aqueous electrolyte. Optionally, in order to impart incombustibility, a halogen-containing solvent, such as carbon tetrachloride or ethylene trifluoride, may be further added. In order to improve high-temperature storage characteristics, carbon dioxide gas may be further added.

MODE FOR DISCLOSURE

Hereinafter, the present disclosure will be explained in more detail with reference to the examples. The following examples are for illustrative purposes only and not intended to limit the scope of the present disclosure.

EXAMPLE 1-1

Manufacture of Positive Electrode

Aluminum foil having a thickness of 12 μm and an elongation of 2.4% was prepared as a positive electrode current collector.

In addition, $LiNi_{0.6}Mn_{0.2}Co_{0.2}O_2$ (average particle diameter: 6 μm) as a positive electrode active material, polyvinylidene fluoride (PVDF) as a binder and Denka black as a conductive material were introduced to N-methyl pyrrolidone (NMP) as a solvent at a ratio of 93:4:3 by weight to prepare a slurry for forming a positive electrode active material layer.

The slurry for forming a positive electrode active material layer was coated onto both surfaces of the aluminum foil, and drying and rolling were carried out to obtain a positive electrode active material layer having a thickness of 120 μm. The positive electrode active material layer had a rolling porosity of 27%.

The finished positive electrode had an elongation of 1.17%.

EXAMPLE 1-2

Manufacture of Secondary Battery

Copper foil having a thickness of 10 μm was prepared as a negative electrode current collector.

Natural graphite as a negative electrode active material, SBR and CMC as binders and Denka black as a conductive material were added to water as a solvent at a ratio of 97:2:1 by weight to prepare a slurry for forming a negative electrode active material layer. The slurry for forming a negative electrode active material layer was coated onto both surfaces of a negative electrode current collector, and drying and rolling were carried out to obtain a negative electrode.

A separator made of polyethylene was interposed between the negative electrode and the positive electrode to provide an electrode assembly, which, in turn, was introduced to a pouch, and then an electrolyte containing ethylene carbonate (EC):dimethyl carbonate (DMC):ethyl methyl carbonate (EMC)=3:4:3 and 1M $LiPF_6$ was introduced thereto to obtain a pouch-type monocell.

EXAMPLE 2-1

Manufacture of Positive Electrode

A positive electrode was obtained in the same manner as Example 1-1, except that the porosity was 31%. The finished positive electrode had an elongation of 1.35%.

EXAMPLE 2-2

Manufacture of Secondary Battery

A secondary battery was manufactured in the same manner as Example 1-2, except that the positive electrode according to Example 2-1 was used.

EXAMPLE 3-1

Manufacture of Positive Electrode

A positive electrode was obtained in the same manner as Example 1-1, except that the average particle diameter of the active material was 10 μm. The finished positive electrode had an elongation of 1.48%.

EXAMPLE 3-2

Manufacture of Secondary Battery

A secondary battery was manufactured in the same manner as Example 1-2, except that the positive electrode according to Example 3-1 was used.

COMPARATIVE EXAMPLE 1-1

Manufacture of Positive Electrode

A positive electrode was obtained in the same manner as Example 1-1, except that aluminum foil having a thickness of 15 μm and an elongation of 2.9% was used. The finished positive electrode had an elongation of 1.73%.

COMPARATIVE EXAMPLE 1-2

Manufacture of Secondary Battery

A secondary battery was manufactured in the same manner as Example 1-2, except that the positive electrode according to Comparative Example 1-1 was used.

COMPARATIVE EXAMPLE 2-1

Manufacture of Positive Electrode

A positive electrode was obtained in the same manner as Example 1-1, except that the average particle diameter of the active material was 14 μm. The finished positive electrode had an elongation of 1.95%.

COMPARATIVE EXAMPLE 2-2

Manufacture of Secondary Battery

A secondary battery was manufactured in the same manner as Example 1-2, except that the positive electrode according to Comparative Example 2-1 was used.

TEST EXAMPLE

Nail Penetration Test

Each of the secondary batteries according to Examples 1-2 to 3-2 and Comparative Examples 1-2 and 2-2 was fully charged at 25° C. under 4.15V, and a nail having a diameter of 3 mm was used and allowed to penetrate through the center of a battery. Then, each battery is observed whether ignition occurs or not. Herein, the nail penetration rate was set to 80 mm/sec.

The results are shown in the following Table 1.

TABLE 1

| | Elongation (%) | Nail Penetration Test Results (Nail diameter 3 mm, Nail tip angle 30°, Penetration rate 80 mm/s) |
|---|---|---|
| Ex. 1-2 | 1.17 | Hazard level 2, No event |
| Ex. 2-2 | 1.35 | Hazard level 2, No event |
| Ex. 3-2 | 1.48 | Hazard level 2, No event |
| Comp. Ex. 1-2 | 1.73 | Hazard level 5, Ignition (Fire) |
| Comp. Ex. 2-2 | 1.95 | Hazard level 5, Ignition (Fire) |

Hazard level 0: No event
Hazard level 1: Passive protection activated (No defect, no leakage; no venting, fire or flame; no rupture; no explosion; no exothermic reaction or thermal runaway. Cell reversibly damaged. Repair of protection device needed)
Hazard level 2: Defected/damaged (No leakage; no venting, fire, or flame; no rupture; no explosion; no exothermic reaction of thermal runaway. Cell irreversibly damaged. Repair needed)
Hazard level 3: Leakage Δmass <50% (No venting, fire or flame; no rupture; no explosion. Weight loss <50% of electrolyte (solvent + salt) weight)
Hazard level 4: Venting Δmass ≥50% (No fire or flame; no rupture; no explosion. Weight loss ≥50% of electrolyte weight)
Hazard level 5: Ignition (Fire) or flame (No rupture; no explosion)
Hazard level 6: Rupture (No explosion, but flying parts of the active mass)
Hazard level 7: Explosion

What is claimed is:

1. A positive electrode for a secondary battery, comprising:
    a positive electrode current collector; and
    a positive electrode active material disposed on at least one surface of the positive electrode current collector,
    wherein the positive electrode has an elongation of 0.6-1.5%,
    the elongation is measured in accordance with ISO527, and
    wherein the elongation is an average elongation of an elongation in a machine direction and an elongation in a transverse direction.

2. The positive electrode for a secondary battery according to claim 1, wherein the positive electrode current collector has a thickness of 6-20 μm.

3. The positive electrode for a secondary battery according to claim 1, wherein the positive electrode current collector is aluminum foil.

4. The positive electrode for a secondary battery according to claim 1, wherein the positive electrode active material has an average particle diameter of 4-12 μm.

5. The positive electrode for a secondary battery according to claim 1, wherein the positive electrode active material layer has a porosity of 23-35% after rolling.

6. A secondary battery comprising the positive electrode as defined in claim 1, a negative electrode and a separator interposed between the positive electrode and the negative electrode.

* * * * *